Figure 1:
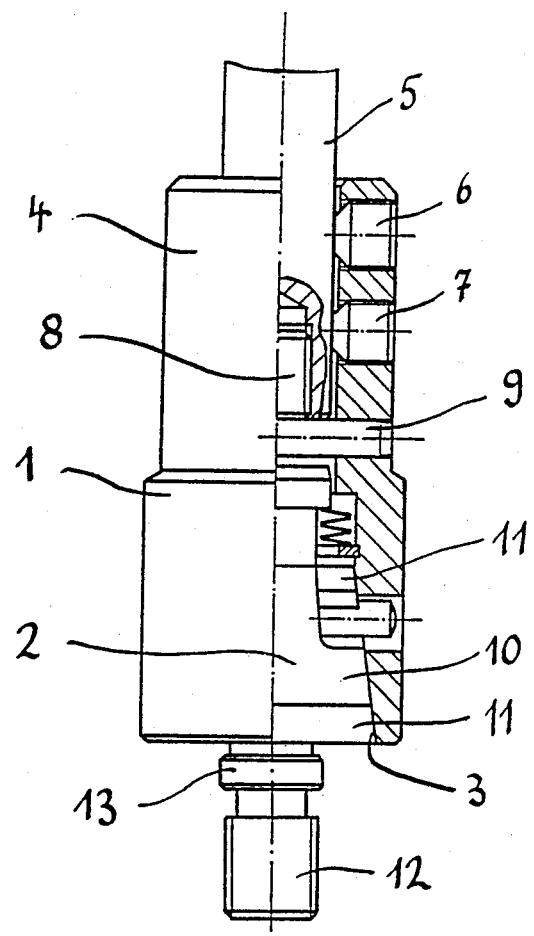

United States Patent [19]

Friesinger et al.

[11] Patent Number: 4,906,147
[45] Date of Patent: Mar. 6, 1990

[54] CLAMPING MECHANISM

[75] Inventors: Julius Friesinger, Horb-Dettingen; Otto Katz, Horb-Bildechingen, both of Fed. Rep. of Germany

[73] Assignee: Ledermann GmbH Co., Horb, Fed. Rep. of Germany

[21] Appl. No.: 256,497

[22] Filed: Oct. 12, 1988

[30] Foreign Application Priority Data

Oct. 17, 1987 [DE] Fed. Rep. of Germany ... 8715181[U]

[51] Int. Cl.$^4$ .......................... B23B 31/00; B23Q 3/00
[52] U.S. Cl. .................................... 409/232; 279/1 T; 403/349; 409/234
[58] Field of Search ..................... 403/349, 348, 357; 409/232, 233, 234; 279/1 T, 23 R, 77, 79, 86, 89, 93, 94, 97

[56] References Cited

U.S. PATENT DOCUMENTS

| 1,494,859 | 5/1924 | Miller et al. | 279/93 |
| 2,039,855 | 5/1936 | Stone | 279/89 |
| 2,337,402 | 12/1943 | Mills | 279/93 |
| 2,526,998 | 10/1950 | Davis | 279/93 |
| 2,612,377 | 9/1952 | Edens | 279/79 |
| 3,118,345 | 1/1964 | Bullard, III et al. | 409/233 |
| 4,632,613 | 12/1986 | Wollermann | 279/89 |

FOREIGN PATENT DOCUMENTS

| 928506 | 12/1947 | France | 403/349 |
| 524620 | 8/1976 | U.S.S.R. | 279/89 |

Primary Examiner—Daniel Howell
Attorney, Agent, or Firm—Bachman & LaPointe

[57] ABSTRACT

Various clamping mechanisms are known for clamping shank-like tools such as drills, milling cutters and the like. The known clamping mechanisms often require long setting times involving long idle times when changing tools, particularly on machines with several spindles. The instant disclosure teaches a clamping mechanism allowing rapid tool change on the machine spindles and having good concentricity characteristics. A bayonet catch-like locking device is used for this purpose.

8 Claims, 9 Drawing Sheets

CLAMPING MECHANISM

The invention relates to a clamping mechanism, particularly a coupling for machine tools.

Various clamping mechanisms are known for clamping shank-type tools, such as drills, milling cutters, etc. In the case of mechanical clamping mechanisms the clamping force is generally applied by clamping screws, collets, etc. or by means of cap nuts in the case of taper shank receptacles. In addition, expansion clamping mechanisms are known, in which the clamping force is applied by a pressure medium.

The known clamping mechanisms require long setting-up times, which particularly in the case of machines with several machine spindles lead to long idle times on changing the tools. Such machines are e.g. used in the furniture industry for producing spacing holes, into which are e.g. subsequently inserted the bearing elements for the vertically adjustable partitions.

The problem of the present invention is to provide a clamping mechanism with a receptacle for shank-type tools, which permits a rapid tool change on the machine spindles and also has good concentricity characteristics.

This problem is solved by the coupling for machine tools in accordance with the present invention. The clamping mechanism has a receptacle for a shank-type tool, together with a coupling device, which comprise two coupling parts, whereof one has an internal cone and the other a corresponding external cone. The external cone is formed by a conical frustum, which can have recesses, which with a locking element of the other coupling part form a detachable arresting means. The arresting means is preferably formed by a cross pin, which is axially resiliently mounted, and a bayonet catch-like recess on the conical frustum of the other coupling part. The connection between the two coupling parts can therefore take place in very simple manner in that the conical frustum is axially inserted and turned in the conical bore of the other coupling part. The cross pin is axially displaced from its inoperative position against spring tension and locks in a bulge of the bayonet catch. The spring tension acting on the cross pin draws the conical frustum into the axial bore, so that a non-positive connection is obtained. Simultaneously the bulge, in conjunction with the cross pin held therein, forms a rotation prevention means.

A tool change can take place by detaching a worn tool from the second coupling part by briefly turning on the first coupling part, on which is also formed the receptacle for the tool. A new shank tool, which has been inserted beforehand in the receptacle of a separate coupling part, can be mounted in the reverse manner on the second coupling part connected to the machine spindle and arrested by brief turning. The cross pin can be mounted in elongated holes in the wall of the first coupling part and drawn axially inwards by spring tension via a retaining bolt. However, in the same way the clamping element can be so constructed that the cross pin is arranged in the second coupling part and traverses there the conical frustum. In this construction a spring element could be arranged in the frustum and could pretension the cross pin guided in the elongated holes. The bayonet catch-like recesses must in the case of this alternative embodiment be formed in the wall of the coupling part, which has a conical bore.

The bulge provided in the bayonet catch-like recess and which serves as a rotation prevention means has a radius corresponding to that of the cross pin, which leads to a clearance-free positioning.

The cross pin can be drawn against a stop by means of a set of springs or an elastic material thrust piece. It is also possible to make the cross pin from an elastic or resilient material and/or to mount same in elastic bearing elements in the elongated holes of the coupling part wall.

The cross pin can also be rigidly arranged and in this case the recesses of the other coupling part acting on the cross pin can be arranged so as to be axially displaceable against spring tension.

Apart from bulges acting on the cross pin, rotation prevention means could also be constituted by conventional locking bolts engaging in locking openings on the facing part. It is also possible to provide an elastic shim in one of the coupling parts and against which the other coupling part presses. The clamping or friction surface between the shim and the engaging coupling part acts as a rotation prevention means.

In order to permit an exact positioning of the shank-type tools to be inserted in the recess, a clearly defined stop must be provided in the receptacle against which the shank tool inserted engages with a stop element adjustable on the shank end.

Advantageous further developments of the invention can be gathered from the subclaims. The invention is described in greater detail hereinafter relative to the drawings, wherein show:

FIG. 1—A first embodiment of a clamping mechanism in the fitted state.

Figure 2:
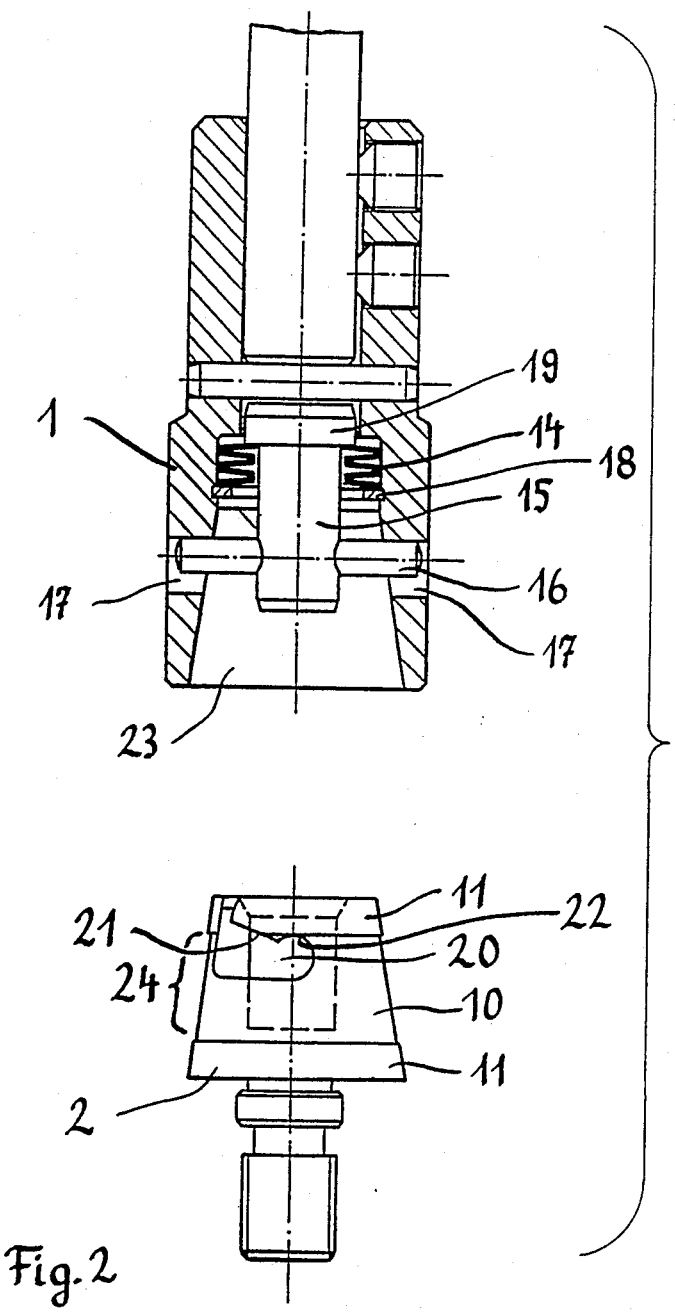

FIG. 2—The clamping mechanism of FIG. 1 in the disassembled state.

Figure 3:
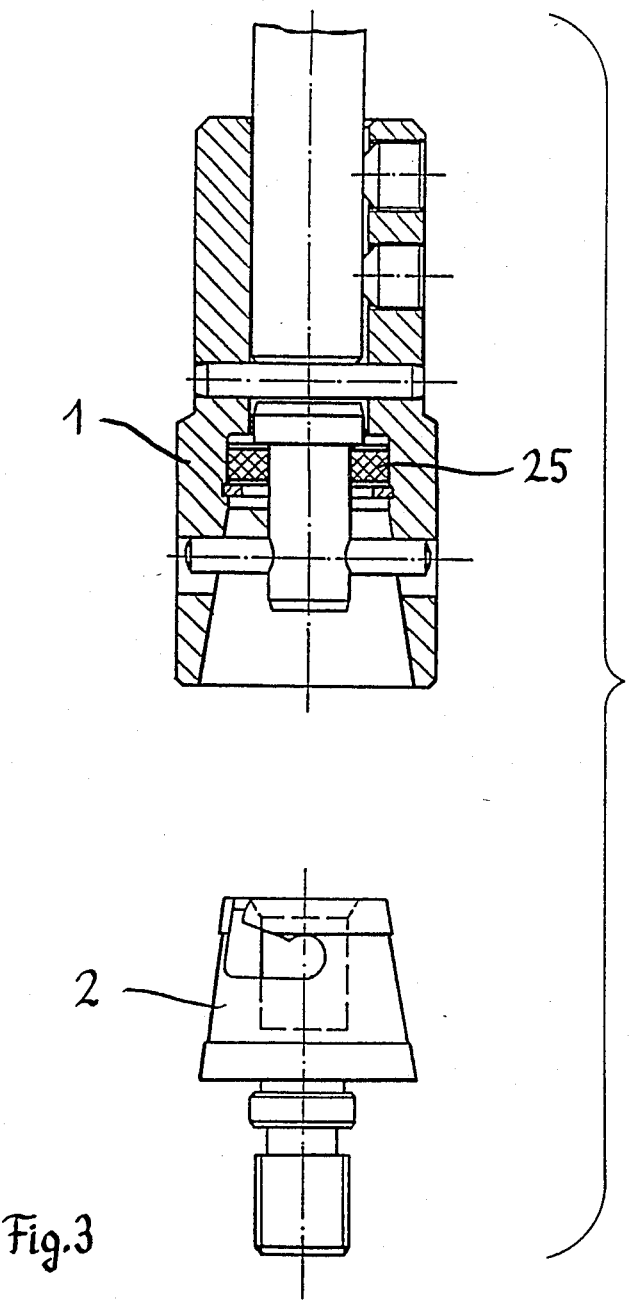

FIG. 3—Another embodiment with an elastic thrust piece as the spring element.

Figure 4:
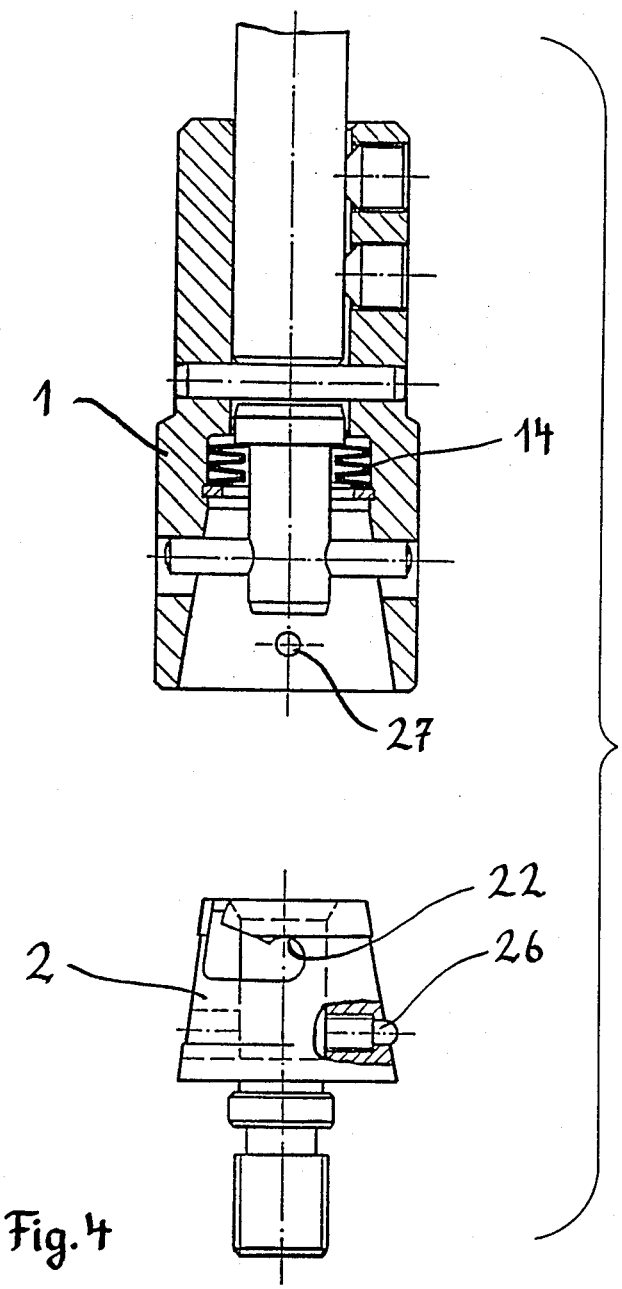

FIG. 4—A further construction with a resiliently mounted locking bolt as a rotation prevention means.

Figure 5:
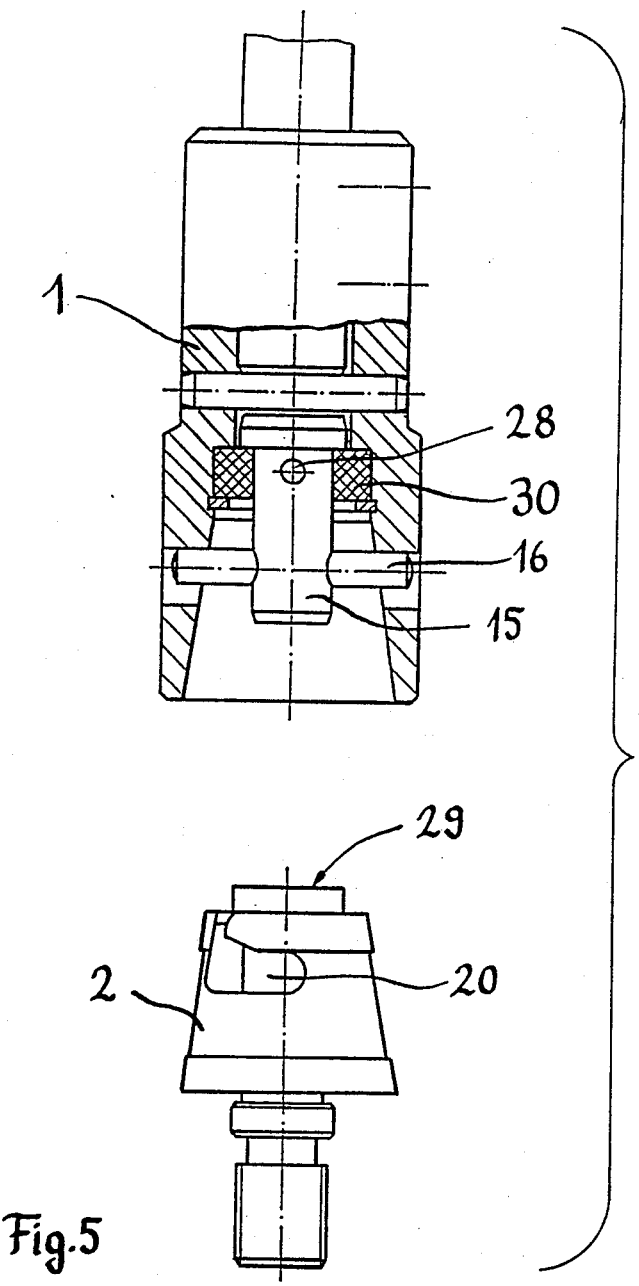

FIG. 5—Another embodiment of a clamping mechanism with a rigidly arranged cross pin.

Figure 6:
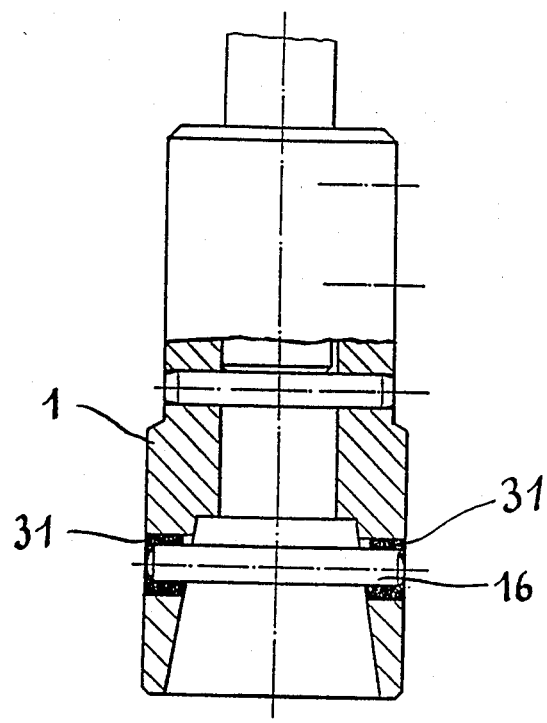

FIG. 6—A clamping mechanism with an elastically mounted cross pin.

Figure 7:
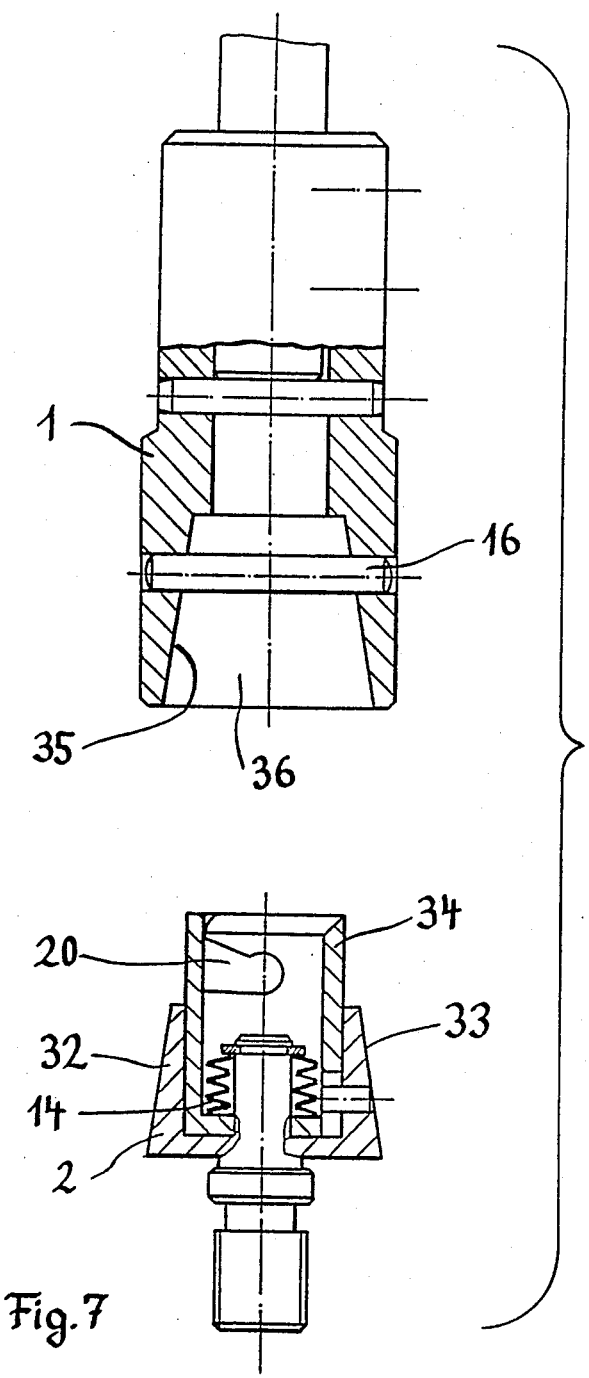

FIG. 7—A clamping mechanism in which on the frustum-shaped coupling part the recesses in which can be locked a rigidly arranged cross pin are resiliently positioned.

Figure 8:
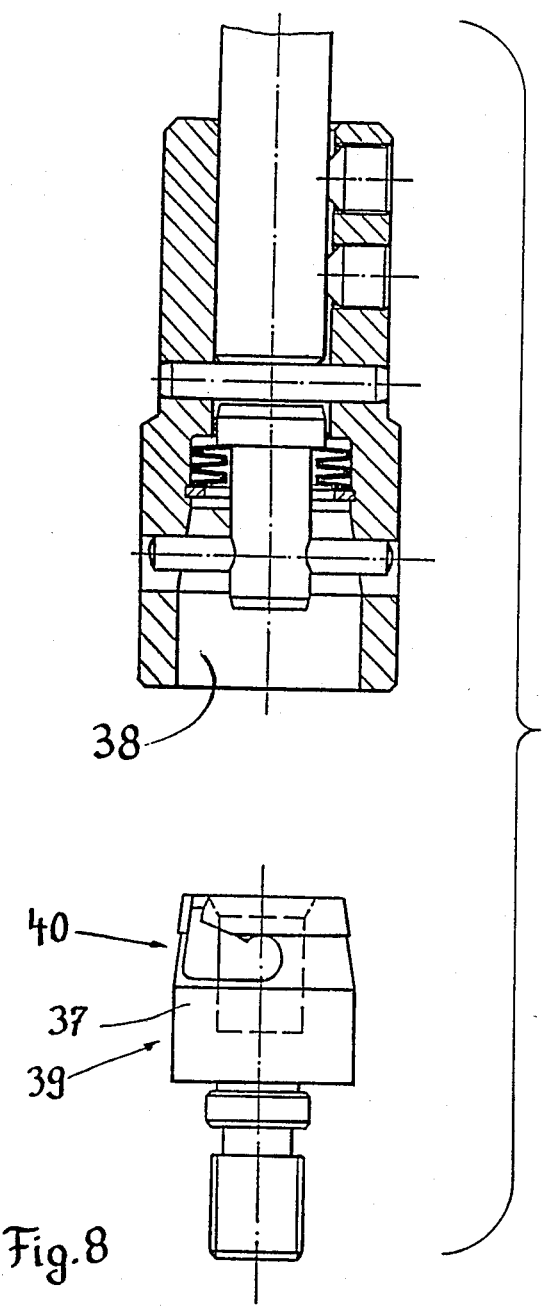
Figure 9:
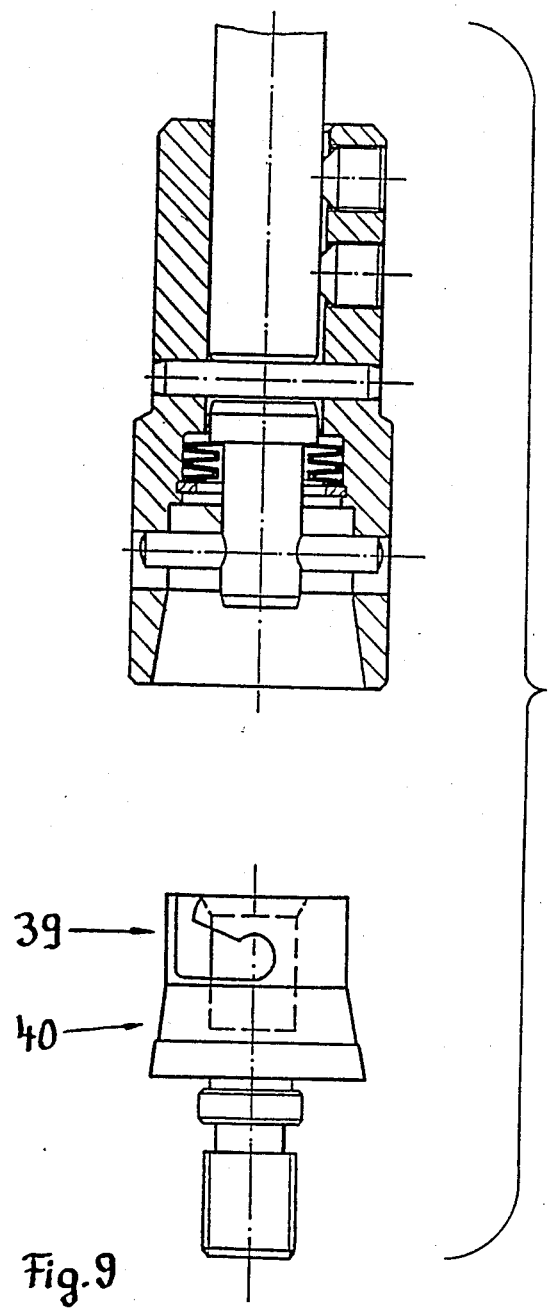

FIGS. 8 and 9—Further embodiments with different bearing surfaces for the coupling parts.

The clamping mechanism shown in FIG. 1 comprises a first coupling part 1 and a second coupling part 2, which is inserted in an axial bore 3 of the first coupling part 1. The latter has at its upper end a receptacle 4 in which is fixed the shank 5 of a shank-type tool by means of locking screws 6, 7. With an adjustable stop element 8, shank 5 engages on a detent pin 9.

The second coupling part 2 has a conical frustum 10 with a conical circumferential surface 11, which engages on the corresponding, conically constructed axial bore 3. For fixing the coupling part 2 on a not shown machine spindle, the latter has a thread 12 and a spigot 13.

Further details of the clamping element are explained in greater detail relative to FIG. 2. In coupling part 1 is provided a retaining bolt 15 axially displaceable against a spring element 14 and to which is fixed a cross pin 16 as the locking element. The ends of the cross pin 16 engage in elongated holes 17 of the wall of coupling part 1. Spring element 14, which can be in the form of a set of springs, is supported on a stop 18 and presses against the projecting bolt head 19. Thus, the cross pin 16 is held under pretension in the inoperative position shown here. The coupling part 2 has a bayonet catch-like recess 20, which forms an arresting means in conjunction with cross pin 16. Coupling part 2 can be inserted and turned in axial bore 3, the cross pin 16 being drawn downwards along bevel 21 until it locks in bulge 22. Frustum 10 is consequently drawn into the axial bore 3 with the spring tension acting on cross pin 16 and is pressed with its conical circumferential surface 11 against the conical inner face 23 of axial bore 3.

The conical circumferential surface 11 does not pass uniformly over the entire conical frustum 10 and is instead interrupted by a wide step 24. As a result of this measure a particularly exact positioning and a correspondingly exact concentricity are obtained.

In the case of the clamping mechanism shown in FIG. 3, in place of the spring element in the form of a set of springs there is an elastic pressure or thrust piece 25 made from rubber or a similar material. Otherwise the clamping mechanism of FIG. 3 does not differ from that of FIG. 2.

The clamping mechanism according to FIG. 4 has on its coupling part 2 connectable with a machine spindle, a resilient locking bolt 26, which serves as a rotation prevention means and which locks in a corresponding opening 27 on coupling part 1 when the two parts 1 and 2 are assembled. In this case bulge 22 could be eliminated and be replaced by a horizontal recess edge.

FIG. 5 shows a clamping mechanism in which the retaining bolt 15 is rigidly connected by means of a fixing pin 28 to the coupling part 1 so as to prevent relative rotational movement. Coupling part 2 presses with a projecting bearing face 29 against an elastic shim 30 on insertion into coupling part 1. As a result of the friction between surface 29 and shim 30 the coupling part 2 is held in an adequate non-rotary manner in coupling part 1. In this case recess 20 does not have a bulge 22, such as is e.g. present with the clamping mechanism according to FIG. 2.

FIG. 6 only shows the coupling part 1, in which the cross pin 16 is mounted in elastic bearing elements 31. The latter permit a resilient, axial deflection of cross pin 16, so that here e.g. the coupling part 2 according to FIG. 2 can be used.

In the case of the clamping mechanism shown in FIG. 7 the cross pin 16 is rigidly fixed in coupling part 1. Coupling part 2 has a conical frustum 32 with a through conical circumferential surface 33. Over the upper end face of frustum 32 projects a resiliently mounted sleeve 34, which is pressed downwards into the presently represented position by spring elements 14. As with the coupling part 2 according to FIG. 2, there is once again a bayonet catch-like recess 20 on sleeve 34, in which locks the cross pin 16 on assembling coupling parts 1 and 2 following a slight rotation of coupling part 2. Sleeve 34 is thereby slightly raised against the spring tension of spring element 14, so that the conical circumferential surface 33 is pressed with spring tension against the correspondingly constructed conical face 35 of axial bore 36.

FIGS. 8 and 9 show two further embodiments of clamping mechanisms, in which the circumferential surface 13 and the corresponding inner face 38 of the axial bore is subdivided into a cylindrical region 39 and a conical region 40. Otherwise the clamping mechanisms according to FIGS. 8 and 9 correspond to those of FIGS. 1 and 2.

We claim:

1. A clamping mechanism for machine tools comprising:

a first coupling part, said first coupling part having a conical axial bore and at least two radial holes penetrating said conical axial bore;

a locking element positioned within said conical axial bore, said locking element having a retaining bolt located axially within said conical axial bore and a radially extending cross pin which extends into said at least two radial holes for fixing said locking element for limited axial movement within said conical axial bore;

resilient biasing means engaging said locking element for biasing said locking element in a first direction within said conical axial bore; and a second coupling part insertable within said conical axial bore, said second coupling part having engagement means for selectively engaging said radially extending cross pin for holding said second coupling part in place within said conical axial bore under the force of said resilient biasing means.

2. Clamping mechanism according to claim 1, characterized in that the engagement means has a means for preventing the relative rotation of the two coupling parts (1, 2).

3. Clamping mechanism according to claim 2, characterized in that the means for preventing relative rotation comprises a recess (20) having an axially oriented bulge (22) with a radius corresponding to that of cross pin (16).

4. Clamping mechanism according to claim 3, characterized in that a locking bolt (26) of one of the coupling parts engages in a locking opening (27) of the other coupling part (1, 2).

5. Clamping mechanism according to claim 1, further including an elastic shim (30) in the first coupling part (1), which presses with a clamping or friction face against an end face (29) of the second coupling part (2).

6. Clamping mechanism according to claim 1, characterized in that the resilient biasing means is supported on a stop (18) in the conical axial bore in the first coupling part (1).

7. Clamping mechanism according to claim 1, characterized in that the first coupling part (1) is provided with a receptacle (4) for a shank-type tool and that the second coupling part (2) has a fixing element enabling the second coupling part (2) to be fixed to a machine spindle.

8. Clamping mechanism according to claim 7, characterized in that the receptacle (4) has a detent (9) against which engages the end of the shank-type tool provided with an adjustable stop element (8).

* * * * *